United States Patent
Hajek et al.

(10) Patent No.: US 12,269,932 B2
(45) Date of Patent: Apr. 8, 2025

(54) HARDENABLE CASTING COMPOUND FOR PRODUCING MOLDED PLASTIC COMPONENTS

(71) Applicant: BLANCO GMBH + CO KG, Oberderdingen (DE)

(72) Inventors: Andreas Hajek, Weingarten (DE); Benjamin Senk, Sinsheim (DE); Julia Gansel, Bruchsal (DE)

(73) Assignee: BLANCO GMBH + CO KG, Oberderdingen (DE)

( * ) Notice: Subject to any disclaimer, the term of this patent is extended or adjusted under 35 U.S.C. 154(b) by 783 days.

(21) Appl. No.: 17/602,446

(22) PCT Filed: Feb. 17, 2020

(86) PCT No.: PCT/DE2020/200012
§ 371 (c)(1),
(2) Date: Oct. 8, 2021

(87) PCT Pub. No.: WO2020/207541
PCT Pub. Date: Oct. 15, 2020

(65) Prior Publication Data
US 2022/0213289 A1 Jul. 7, 2022

(30) Foreign Application Priority Data
Apr. 11, 2019 (DE) .................. 10 2019 205 279.7

(51) Int. Cl.
| | | |
|---|---|---|
| C08J 9/32 | (2006.01) | |
| C08J 9/00 | (2006.01) | |
| C08K 3/34 | (2006.01) | |
| C08K 7/22 | (2006.01) | |

(52) U.S. Cl.
CPC ............... *C08J 9/32* (2013.01); *C08J 9/0066* (2013.01); *C08K 3/34* (2013.01); *C08K 7/22* (2013.01); *C08J 2201/026* (2013.01); *C08J 2203/22* (2013.01); *C08J 2207/00* (2013.01); *C08J 2333/06* (2013.01); *C08K 2201/005* (2013.01)

(58) Field of Classification Search
CPC ........ C08J 9/32; C08J 9/0066; C08J 2203/22; C08J 2207/00; C08J 2333/06; C08J 2201/026; C08K 3/34; C08K 7/22; C08K 2201/005
USPC .......................................................... 521/56
See application file for complete search history.

(56) References Cited

U.S. PATENT DOCUMENTS 5,665,785 A * 9/1997 McClellan ................ B60C 7/00
521/145
6,664,314 B1 * 12/2003 Hajek ................... C08F 265/06
523/218

FOREIGN PATENT DOCUMENTS

| DE | 198 12 123 | 9/1999 | |
| JP | 2001-335382 | 12/2001 | |
| JP | 2001335382 A * | 12/2001 | ............. C04B 26/06 |

OTHER PUBLICATIONS

Written Opinion of the International Searching Authority issued May 7, 2020 in International (PCT) Application No. PCT/DE2020/200012 with English translation.
International Search Report issued May 7, 2020 in International (PCT) Application No. PCT/DE2020/200012 with English translation.

* cited by examiner

Primary Examiner — Michael M. Bernshteyn
(74) Attorney, Agent, or Firm — Wenderoth, Lind & Ponack, L.L.P.

(57) ABSTRACT

The invention relates to a hardenable casting compound for producing molded plastic components, comprising a casting compound having a binder material composition and a filler material composition, wherein the filler material composition comprises at least one portion of granular mineral particles, wherein a filler material composition comprises a second portion of expandable microcells having less than 1.0 wt. %.

20 Claims, No Drawings

HARDENABLE CASTING COMPOUND FOR PRODUCING MOLDED PLASTIC COMPONENTS

The invention relates to a hardenable casting compound for producing molded plastic components, comprising a casting compound having a binder material composition and a filler material composition, wherein the filler material composition comprises at least one portion of granular mineral particles.

The invention also relates to a use of a hardenable casting compound.

Beyond this, the invention relates to a molded plastic component produced using a hardenable casting compound.

Hardenable casting compounds are used for producing molded plastic components, in particular in the sanitation or kitchen sectors, such as kitchen sinks, countertops, bathtubs, washbasins, and the like. The hardenable casting compounds usually comprise a binder material and a filler material for improving the mechanical properties of the molded plastic components, as is known for example from DE 38 32 351 or WO 2005-071000A1.

But such hardenable casting compounds have the disadvantage that surfaces of molded plastic components produced therewith are difficult to clean, and thus that the surface has bad cleanability. For this purpose, it is known from EP 1 240 221 B1 to add a portion of particulate, hydrophobic and/or oleophobic plastic material to the hardenable casting compound. From EP 1 487 906 A1 it is also known to add a hydrophobic monomer component, which comprises at least a organosiloxane functionalized with an unsaturated group.

An object of the present invention is therefore to provide an alternative casting compound and molded plastic components, which comprise at least comparable cleanability.

The invention achieves the object of a hardenable casting compound for producing molded plastic components, comprising a casting compound having a binder material composition and a filler material composition, wherein the filler material composition comprises at least one portion of granular mineral particles, through a filler material composition comprising a second portion of expandable microcells having less than 1 wt. %.

The present invention also achieves the object through the use of the hardenable casting compound according to any of claims 1-12 for producing a molded plastic component for the kitchen and/or sanitation sectors, in particular for kitchen sinks and countertops for kitchens.

The present invention also achieves the object through the use of a molded plastic component produced using the hardenable casting compound according to any of claims 1-12.

One of the advantages achieved thereby is that the cleanability of surfaces of molded plastic components can be improved: By using expandable microcells in a very small concentration, it was surprisingly determined that the cleaning work can be improved with a standardized test contamination. In other words, a reduction in the required cleaning cycles for attaining a specific degree of contamination for example by more than 25% compared to material samples without expandable microcells could be attained. The content of the hardenable casting compound of granular mineral particles ensures that molded plastic components made therewith having a structured surface, for example a decorative granite surface, can be obtained. In this way, despite the use of expandable microcells in the hardenable casting compound, the structuring of surfaces is substantially maintained, so that the visual attractiveness associated with the structuring, for example the similarity of a decorative granite surface with natural granite, is largely maintained.

Further features, advantages and embodiments of the invention are described below or are disclosed therein.

According to an embodiment, the second portion is less than 0.5 wt. %, in particular less than 0.25 wt. %, preferably less than 0.175 wt. % and/or at least 0.10 wt. %, preferably at least 0.15 wt. %. The cost for the provision of the hardenable casting compound is thereby reduced without the cleanability of the same being worsened.

According to another embodiment, the expandable microcells are designed to be thermoplastic. The advantage of this is that an expansion of the microcells based on temperature dependence, in particular by heating, is made possible in a simple manner during the production of the molded plastic component.

According to another embodiment, the expandable microcells are designed to be spherical. By means of the spherical shape, an even expandability and a homogeneous distribution of the microcells in the hardenable casting compound is made possible.

According to another embodiment, the average diameter of the spherical microcells is between 10 μm and 30 μm, preferably between 15 μm and 25 μm. This enables a further improvement in cleanability without detracting from the visual structuring of the surface.

According to another embodiment, the average density of the expandable microcells is less than 30 kg/cubic meter, in particular less than 20 kg/cubic meter, preferably less than 15 kg/cubic meter, in particular less than 10 kg/cubic meter. Microcells with such a density in the hardenable casting compound, the binder of which usually comprises a greater density, remain substantially evenly distributed after transfer of the hardenable casting compound into a casting mold for producing a molded plastic component. In other words, a simple producibility of a molded plastic component by means of the hardenable casting compound is made possible.

According to another embodiment, the expandable microcells comprise an enclosed cavity volume of at least 20%, preferably at least 30%, in particular at least 50% of the total volume of a microcell. A sufficient expandability of the microcells is thereby ensured.

According to another embodiment, the binder material composition comprises at least a portion of a liquid monomer acrylate. The advantage of this is that in the production of a molded plastic part said liquid monomer acrylate can be polymerized into a polyacrylate by hardening. To increase the viscosity of the hardenable casting compound, a portion of a pre-polymerized acrylate component can be added to the monomer acrylate, for example pre-polymerized polymethylmethacrylate PMMA can be added to the monomer methyl acrylate.

According to another embodiment, the material of the mineral particles comprises silicate and/or aluminum hydroxide-based compositions. For example, silicate filler materials can comprise glass, quartz, cristobalite or the like. Aluminum hydroxide-based filler materials may comprise for example aluminum trihydrate.

According to another embodiment, the filler material composition comprises at least a portion of a peroxide mixture. The advantage of this is that a simple controllability of the polymerization in the production of the molded plastic part is made possible.

According to another embodiment, the hardenable casting compound comprises at least two different kinds of granular mineral particles. The advantage of this is the increased flexibility with respect to the design in the structured surface.

According to another embodiment, the ratio of the weight proportion of expandable microcells and the weight proportion of at least one kind of the at least two kinds of granular particles is less than 10%, in particular less than 5%, preferably between 2% and 3%.

A substantial increase in the cleanability of the surface of molded plastic parts is thereby achieved, without essential properties of the essential composition of the hardenable casting compound having to be changed and thus the production process having to be adapted in an expensive manner.

Other important features and advantages of the invention result from the dependent claims and the explanation below.

It is understood that the above-mentioned features and features yet to be explained, not only may not only be used in the respectively indicated combination, but rather also in other combinations or alone, without departing from the present invention.

Preferred designs and embodiments of the invention are explained further in the description below.

It was found that through the use of expandable microcells according to the invention, in particular expandable microspheres, an improvement in the cleanability of the surface, in particular the visible side of a molded plastic component, is made possible.

COMPARABLE EXAMPLE 1

A hardenable casting compound is produced in which a binder material is added to a filler material. The binder material is obtained through the dissolution of PMMA in MMA in such a way that the binder material comprises 19 wt. % PMMA and 81 wt. % MMA. Additionally, stearic acid and trimethylpropantrimethacrylate (TRIM) is added as crosslinking agent.

The filler material comprises different types of the granular quartz material Granucol® (GebrUder Dorfner GmbH & Co., Hirschau) and Wollastonit (Quarzwerke, Frechen) The following types of Granucol® and Wollastonit were used:

Granucol® earth brown 4/8 (average particle size 570 micrometers)

Granucol® white 1/8 (average particle size 570 micrometers)

Granucol® white 2/9 (average particle size 330 micrometers)

Wollastonit (average needle length 1 to 25 micrometers)

Through the use of different Granucol® types, which in particular have different colors, a visually attractive decorative granite can be achieved. The addition of Wollastonit improves the mechanical properties of the molded plastic components that may be produced with the hardenable casting compound and in particular reduces the occurrence of so-called blisters on the molded components, as may occur due to local overheating during the hardening process. The advantages of the use of Wollastonit are described in EP 1 207 180 A1, which is included here by explicit reference.

The filler material is now added to the binder material and mixed homogeneously therewith. A peroxide mixture is further added to the hardenable casting compound to abate the polymerization and harden the casting compound. Such a peroxide mixture may for example comprise di-(4-tert.-butylcyclohexyl)peroxydicarbonate and/or dilauroylperoxide. Alternatively of additionally, the binder comprises one or more crosslinking agents. Possible crosslinking agents may be for example materials from the group of aliphatic or aromatic di-, tri- or multifunctional acrylates or methacrylates and/or the epoxy acrylates or methacrylates and/or the aliphatic or aromatic di-, tri- or multifunctional urethane acrylates or methacrylates and/or di-, tri- or multifunctional polyester acrylates or methacrylates and/or the di-, tri- or multifunctional silicon acrylates or methacrylates, silicon urethane acrylates or methacrylates and silicon polyester acrylates or methacrylates or combinations thereof.

The composition of the hardenable casting compound according to comparison example 1 is indicated in Table 1 below, wherein contents of the individual components are indicated in wt. %.

TABLE 1

| Binder (PMMA, 19 wt. % in MMA 81 wt. % | 24.3 |
|---|---|
| Trimethylolpropantrimethacrylate | 0.50 |
| Peroxide mixture | 0.60 |
| Wollastonit | 5.60 |
| Granucol ® earth brown 4/8 | 10.0 |
| Granucol ® white 1/8 | 41.0 |
| Granucol ® white 2/9 | 18.0 |

The peroxide mixture consists substantially of a mixture of dilauroylperoxide and Di(4-tert.-butylcyclohexyl)peroxydicarbonate in a weight ratio of 1.5:1.

The hardenable casting compound is now placed in a casting mold for a kitchen sink and polymerized using heat.

The visible side of a test specimen removed from a kitchen sink thus obtained—hereinafter referred to as specimen—, is now subjected to a defined contamination and a defined cleaning: In connection with the evaluation of the cleanability, or also, expressed in other words, the tendency of the molded plastic component to become contaminated, a synthetic model contamination is used and the cleaning of this contamination is carried out under defined conditions.

The following composition is used as a model contamination:

| 7 wt. % | Special black 4, soot (Degussa AG) |
|---|---|
| 40 wt. % | Process oil 310 (ESSO AG) |
| 17 wt. % | Tricaprylin (Fluka, item no.: 91040) |
| 36 wt. % | Gasoline, Kp. 65/100° C. (Fluka, item no.: 12270) |

Specifically, the experiment in carried out as follows:
Preparation:

The test contamination is agitated using a magnetic agitator for approximately 1 hour prior to application. Using a new flat brush, this must be saturated in advance with the test contamination. After the production of a new test contamination, in particular a new brush is used. This saturation of the brush is performed by brushing a predetermined quantity of test contamination of a film and letting this react for 1 hour. The scouring side of a sponge is cut off with a knife and from the soft side a circle is cut into a shape with a diameter of ca. 8 cm. After each individual cleaning attempt is completed, a new sponge is used and prepared as described above.

Implementation:

After the preparation of the specimen, 5 drops of the test contamination are placed on a watch glass and brushed crosswise onto the middle of the specimen with a brush saturated with the test contamination, so that a square area with an edge length of ca. 4 cm is covered. Then the specimens are stored for 15 min. at a 40° C. in a drying cabinet and then immediately rinsed with hot water at a temperature of approx. 65° C.-70° C. from a hose moved near the specimen surface with increased pressure at a working angle of approx. 80°, i.e., at a distance of approx. 10 cm, in particular by pressing the hose together, until no more test contamination can discernibly be rinsed off.

Then the specimens are rinsed with high-purity water. Afterward, the cleaning is performed in a cleaning device with a Scotch-Brite brand washing sponge from which the scouring side was previously cut off. The cutting area of the sponge piece cut for the purpose of the cleaning device is oriented toward the specimen, fastened with a two-sided adhesive tape to a rotatable plastic disc and moistened with approx. 5 ml of a 5% and previously stirred VISS scouring agent suspension.

Additionally, 1 ml of a 5% VISS scouring agent suspension is placed on the specimen to be cleaned, and then the sponge receptacle of the cleaning device is loaded with 2 kg, which is checked or monitored by a scale arranged under the specimen, which scale is positioned on a laboratory lift. After 10 rotations, respectively, with a rotational speed of 60 rpm, the cleaning state is visually checked after careful dabbing of the cleaning residues with a soft cloth. If the test or soot contamination has not been completely cleaned, 1 ml of 5% scouring agent suspension is applied again and the next 10 cleaning cycles are carried out until there is visually no more test contamination located or discernible on the specimen. The experiment is ended after a maximum of 100 rotations.

On the basis of the previously described test method, the following results resulted as a function of the required rotation numbers until the test contamination was completely cleaned:

Required number of rotations (average from 8 individual tests) according to the comparison example (without Expancel®): 31.25

EXAMPLE 1

A casting compound according to the invention is produced which in its composition largely corresponds to the hardenable casting compound according to comparison example 1, wherein a quantity of expandable microspheres (Expancel® by Akzo Nobel NV) is added in exchange for a corresponding quantity of Wollastonit. The remaining contents of materials are kept the same. In the casting compound obtained in this manner, the Granucol® types and Wollastonit form a first portion of filler material and the expandable microcells form a second portion. The following type of expandable microcells is used:

Expancel® 043DU80 (average diameter d50: 16-24 micrometers, specific density ≤0 kg/m³)

The wall thickness of the expandable microcells is approx. 2 micrometers. The diameter of the microcells is expandable here by a factor of 3 or more based on the effect of temperature, wherein the wall thickness is then reduced by a factor of 20. The interior of the microcells comprises hydrocarbon.

The composition of the hardenable casting compound according to comparison example 1 is indicated in Table 2 below, wherein the contents of the individual components are indicated in wt. %, each relative to 100 kg hardenable casting compound:

TABLE 2

| | |
|---|---|
| Binder (PMMA, 19 wt. % in MMA 81 wt. %) | 24.3 |
| Trimethylolpropantrimethacrylate | 0.50 |

TABLE 2-continued

| | |
|---|---|
| Peroxide mixture | 0.60 |
| Expancel 043DU80 | 0.15 |
| Wollastonit | 5.45 |
| Granucol ® earth brown 4/8 | 10.0 |
| Granucol ® white 1/8 | 41.0 |
| Granucol ® white 2/9 | 18.0 |

The peroxide mixture consists substantially of a mixture of dilauroylperoxide and Di(4-tert.-butylcyclohexyl)peroxydicarbonate in a weight ratio of 1.5:1.

As described for the hardenable casting compound according to the comparison example, one kitchen sink each is produced with the hardenable casting compound according to example 1 and then a test specimen is taken from the kitchen sink. The visible side of a test specimen removed from a kitchen sink thus obtained is now subjected to a defined contamination and a defined cleaning with the preparation described above and by means of the cleaning device described above.

On the basis of the previously described test method, the following results resulted as a function of the required number of rotations until the test contamination was completely cleaned:

Required number of rotations (average from 8 individual tests) according to example 1 according to the invention (with Expancel®): 22.50

The results show that the addition of expandable microcells cause a marked reduction in the cleaning cycles required, in particular by a factor of 1.3, wherein in the comparison described above a reduction by a factor of 331.25/22.50=1.39 was achieved. The kitchen sinks produced with the hardenable casting compound according to one embodiment of the present invention comprise no visual impairments to their decorative granite in comparison with the hardenable casting compound obtained in the comparison example.

The effect of the improved cleanability of the surface thus occurs with the use of the expandable microcells according to the invention.

In summary, at least one of the embodiments of the invention has at least one of the following advantages:

Improved cleanability of the surface of molded plastic components

Very low quantity of required effective additive (Expancel®) and thereby low costs together with substantially improved cleanability High flexibility with respect to the optical design of surfaces Although the present invention was described using preferred embodiment, it is not limited to these, but rather may be modified in various ways.

The invention claimed is:

1. A hardenable casting compound for producing molded plastic components, comprising a casting compound having a binder material composition and a filler material composition, wherein the filler material composition comprises at least one portion of granular mineral particles, and expandable microcells in an amount of less than 0.5 wt. %.

2. The hardenable casting compound according to claim 1, wherein the expandable microcells are present in an amount of less than 0.25 wt. % and/or at least 0.10 wt. %.

3. The hardenable casting compound according to claim 1, wherein the expandable microcells are thermoplastic.

4. The hardenable casting compound according to claim 1, wherein the expandable microcells are spherical.

5. The hardenable casting compound according to claim 4, wherein the average diameter of the spherical expandable microcells is between 10 micrometers and 30 micrometers.

6. The hardenable casting compound according to claim 1, wherein the average density of the expandable microcells is less than 30 kg/m$^3$.

7. The hardenable casting compound according to claim 1, wherein the expandable microcells comprise an enclosed cavity volume of at least 20% of the total volume of a microcell %.

8. The hardenable casting compound according to claim 1, wherein characterized in that the binder material composition comprises at least a proportion of a liquid monomer acrylate.

9. The hardenable casting compound according to claim 1, wherein the material of the mineral particles comprises silicate and/or aluminum hydroxide-based compositions.

10. The hardenable casting compound according to claim 1, wherein the filler material composition further comprises a peroxide mixture.

11. The hardenable casting compound according to claim 1, wherein the hardenable casting compound comprises at least two different kinds of granular mineral particles.

12. The hardenable casting compound according to claim 11, wherein the weight ratio of the expandable microcells to at least one kind of the at least two kinds of granular particles is less than 10%.

13. Use of the hardenable casting compound according to claim 1 for producing a molded plastic component for the kitchen and/or sanitation sectors, in particular for kitchen sinks and countertops for kitchens.

14. A molded plastic component produced using the hardenable casting compound according to claim 1.

15. The hardenable casting compound according to claim 2, wherein the expandable microcells are present in an amount of less than 0.175 wt. % and/or at least 0.15 wt. %.

16. The hardenable casting compound according to claim 5, wherein the average diameter of the spherical expandable microcells is between 15 micrometers and 25 micrometers.

17. The hardenable casting compound according to claim 6, wherein the average density of the expandable microcells is less than 15 kg/m3.

18. The hardenable casting compound according to claim 12, wherein the weight ratio of the expandable microcells to at least one kind of the at least two kinds of granular particles is less than 5%.

19. The hardenable casting compound according to claim 12, wherein the weight ratio of the expandable microcells to at least one kind of the at least two kinds of granular particles is between 2% and 3%.

20. The hardenable casting compound according to claim 7, wherein the expandable microcells comprise an enclosed cavity volume of at least 50% of the total volume of a microcell %.

* * * * *